Sept. 9, 1969         M. M. HANN         3,465,520
HYDROSTATIC TRANSMISSION
Filed Nov. 8, 1967
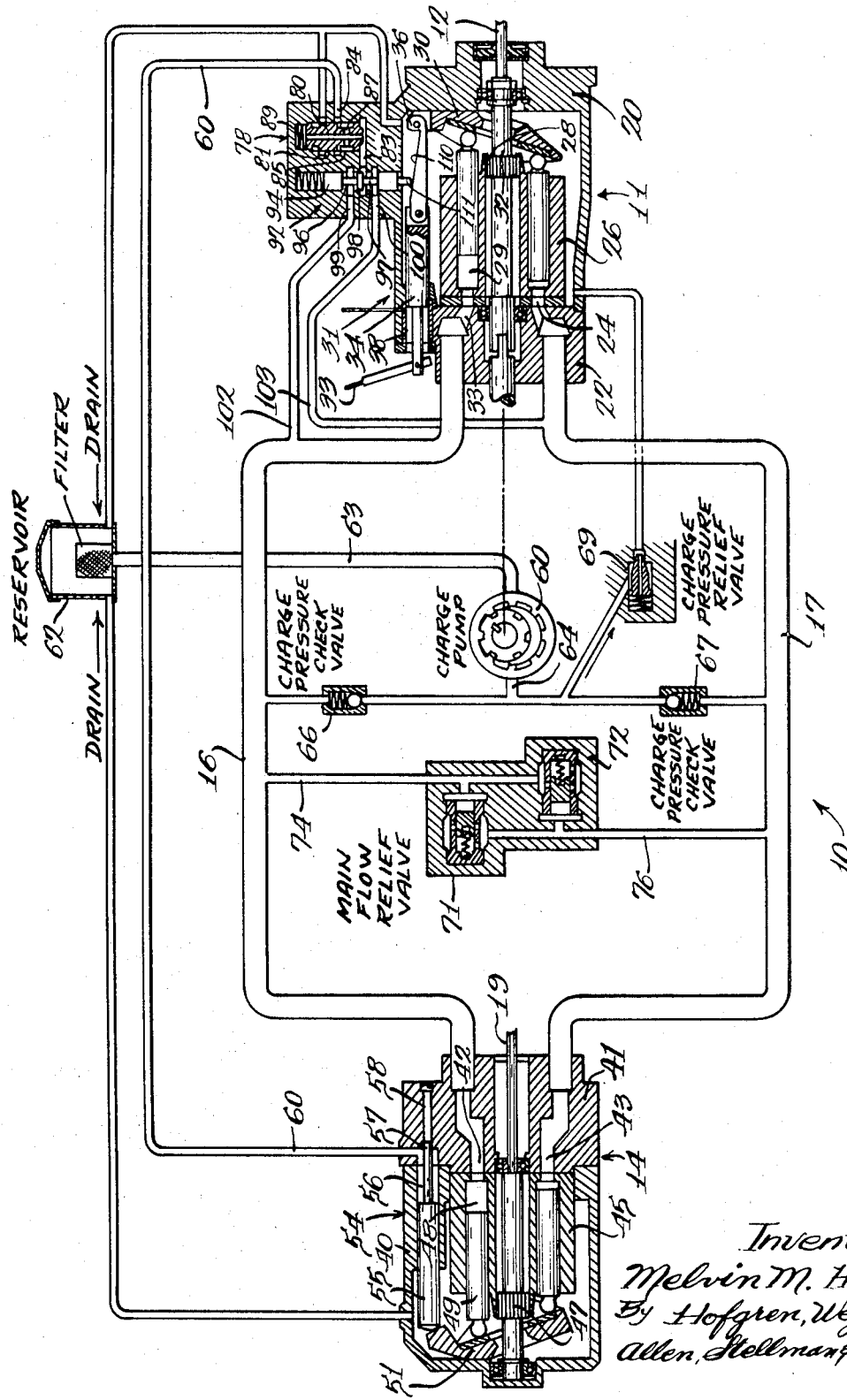
Inventor:
Melvin M. Hann
By Hofgren, Wegner,
Allen, Stellman & McCord
Atty's United States Patent Office 3,465,520
Patented Sept. 9, 1969

3,465,520
HYDROSTATIC TRANSMISSION
Melvin M. Hann, Ottawa, Ill., assignor to Sundstrand Corporation, a corporation of Delaware
Filed Nov. 8, 1967, Ser. No. 681,533
Int. Cl. F16d 33/16
U.S. Cl. 60—53    9 Claims

ABSTRACT OF THE DISCLOSURE

A hydrostatic transmission with a system pressure responsive valve for controlling motor displacement connectable to the normal high pressure one of the conduits interconnecting the pump and motor by a three-way valve which switches the conduit connections to the torque valve only upon a reversal in the displacement of the pump so that as the operator moves the handle toward neutral during braking or the hydraulic motor overruns, and the high pressure line becomes the low pressure line resulting in motoring the engine driven pump, braking is obtained with the motor in minimum displacement thereby reducing the braking effect and providing smooth braking action.

BACKGROUND OF THE INVENTION

The present invention relates generally to hydrostatic transmission and more particularly to a variable displacement vehicular hydraulic transmission. Such transmissions usually consist of a positive displacement hydraulic pump adapted to be driven by the vehicle's prime mover and a positive displacement hydraulic motor connected through suitable gearing to drive the vehicle propelling means. By varying the displacement of one or both of the hydraulic units, the drive ratio between engine speed and motor output speed may be varied as desired to control the speed of the vehicle. These transmissions further oftentimes include what is termed in the art a closed hydraulic circuit interconnecting the pump and the motor consisting of two conduits each adapted to operate as high or low pressure conduits during the periods of acceleration depending upon whether the transmission is operating in its forward or reverse mode.

It is known in transmissions of the type described above that with the vehicle under way if the operator reduces the displacement of the pump, the motor acts as a pump driving the engine driven pump as a motor and thus achieving an inherent braking of the vehicle. During this braking action the normal forward pressure conduit becomes a low pressure conduit and the normal forward low pressure return conduit becomes the high pressure conduit. A similar pressure change occurs during overrunning, i.e., when the demand of the motor increases above the capacity of the pump such as when the vehicle goes down an incline.

In some applications such as in lift trucks and in farm tractors it is desirable to reduce this inherent braking effect to provide a smoother braking action.

SUMMARY OF THE INVENTION

In accordance with the present invention a torque valve is provided for controlling the displacement of the motor during periods of acceleration. The torque valve controls transmission torque by increasing the displacement of the motor in response to increases in system pressure and decreases the displacement of the motor in response to decreases in system pressure. This torque feature is available during both forward and reverse operation of the transmission controlled manually by varying the displacement of the pump on one or the other side of zero displacement.

According to the present invention the torque valve is disabled during periods of overrunning or braking by the provision of a pump displacement control three-way valve which maintains the torque valve in communication with the normal high pressure conduit interconnecting pump and motor even when the normal low pressure conduit becomes the high pressure one during braking or overrunning.

BRIEF DESCRIPTION OF THE DRAWING

While this invention is susceptible of embodiment in many different forms, there is shown in the drawing and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Further objects and advantages will become apparent from the following detailed description taken in connection with the accompanying drawing in which:

FIG. 1 is a schematic diagram of a hydrostatic transmission according to the present invention.

DESCRIPTION OF THE PREFERRED EMBODIMENT

Referring to the drawing, a hydrostatic transmission 10 according to the invention is seen to include generally a variable displacement pump 11, driven by input shaft 12, connected to deliver hydraulic fluid to and receive hydraulic fluid from a variable displacement hydraulic motor 14 through main conduits 16 and 17 forming a closed hydraulic circuit between the pump and the motor. Input shaft 12 is adapted to be connected to the prime mover of the associated vehicle while an output shaft 19, driven by hydraulic motor 14, is adapted to be connected through suitable gearing to drive the propelling means for the vehicle, such as wheels.

The pump 11 and the motor 14 are generally similar in construction and are seen to be variable displacement axial piston hydraulic devices.

The pump 11 includes a housing 20 closed at one end by valve member 22 having inlet and outlet ports 23 and 24 therein. It should be understood that the ports 23 and 24 are shown only schematically in the drawing and as will be apparent to those skilled in the art consist of arcuate ports displaced from the plane of the drawing. A rotary cylinder block 26 is driven by input shaft 12 through a splined connection 28 and has formed therein a plurality of axial cylinders 29 annularly arrayed about the axis of rotation of shaft 12. For reciprocating the pistons a swashplate or cam assembly 30 is provided.

For varying the displacement of the pump 11 the swashplate or cam assembly 30 is pivotable about an axis 32 by a trunnion mounting (not shown). The cam 30 is movable from its maximum forward displacement shown to a vertical zero displacement position and to a maximum displacement position on the other side of zero or neutral to achieve reversible flow from the pump. That is, with the cam in the position shown in the drawing high pressure fluid will be delivered to the motor 14 through conduit 17 driving shaft 19 in one direction. If the operator positions the cam 30 on the other side of neutral high pressure fluid will be delivered to the motor 14 through conduit 16 rotating output shaft 19 in the other direction.

The position of cam 30 and hence the displacement of pump 11 is controlled manually through a linkage 31 consisting of a pivoted (not shown) control handle 33 connected to position link 34 slidable in the housing member 20, in turn driving the cam 30 through a combined link-cam 36 pivotally connected at one end to link 34 and at the other end to cam 30. A suitable known centering spring assembly (not shown) may be provided in cavity 38 to urge the link 34 and thus the cam member 30 to the neutral or zero displacement position.

The motor 14 is generally similar to the pump 11 and is seen to include a housing member 40 having a valve member 41 closing one end thereof. The valve member has inlet and outlet ports 42 and 43 therein communicating respectively with conduits 16 and 17. A cylinder block 45 drives output shaft 19 through a splined connection 47, and has a plurality of axial cylinders 48 therein. Slidable in cylinders 48 are pistons 49 reciprocated by a swashplate or cam assembly 51 pivotally mounted in housing 40 by trunnions (not shown) for the purpose of varying the displacement of the motor.

For varying the position of cam 51 and the displacement of the motor a control motor assembly 54 is provided including a piston 55 slidably mounted in a cylinder 56 formed in housing 40 and valve plate 41. A pilot or guide 57 extends from the piston 55 and is slidable in a bore 58 in valve 41. The displacement of the motor 14 is increased by supplying fluid under pressure in line 60 to cylinder 56 forcing piston 55 to the left pivoting cam 51 toward the maximum displacement position shown in the drawing. The displacement of the motor 14 is reduced by lowering the pressure in line 60 permitting the piston 55 to move to the right pivoting cam 51 toward a minimum displacement position. A suitable spring arrangement (not shown) may be provided acting on the piston 55 for returning the piston and the cam to the minimum displacement position, or the pivot axis of the cam member 51 may be selected so that the inherent moments on the cam 51 caused by the pistons urge the cam toward its minimum displacement position so that in the absence of high fluid pressure being supplied in line 60 the cam will move toward its minimum displacement position. It should be understood that unlike cam 30 for the pump, the cam 51 is movable from a minimum displacement position to a maximum displacement position only on one side of neutral.

A positive displacement gear-type replenishing and cooling pump 60 is driven by suitable means such as the engine or prime mover for the transmission. The replenishing and cooling pump is in communication with a reservoir 62 through an intake conduit 63 for supplying replenishing and cooling fluid to the system through a replenishing and cooling conduit 64. The capacity of the pump is sufficient to replace leakage fluid and to supply cooling fluid to the circuit in excess of that required for the aforementioned purpose in order to maintain the transmission cool.

A pair of spring biased check valves 66 and 67 are in communication with the conduit 64 and with the conduits 16 and 17, respectively, for supplying the replenishing and cooling fluid to the low pressure side of the circuit through one check valve while pressure in the high pressure conduit will maintain the other check valve closed. A spring biased make-up relief valve 69 communicates with the conduit 64 and serves to relieve excess fluid.

Over-pressure relief valves 71 and 72 are provided in communication with each of the main conduit lines by means of the conduits 74 and 76, respectively. The valves serve to prevent abnormally high pressure in either of the two hydraulic lines 16 and 17 by relieving the circuit of such pressures which may occur during rapid acceleration or abrupt braking. In response to this high pressure, the over-pressure valves shift to dump the excess oil to the low pressure side of the transmission circuit. For example, when excessively high pressure exists in line 16, vent fluid through conduit 75 will cause valve 71 to shunt the fluid to line 17 through conduit 76.

For controlling the position of the motor displacement control piston 55 and motor cam 51 a torque multiplication valve 78 is provided. As described above the function of valve 78 is to vary the displacement of motor 14 as a function of system pressure so that when system pressure increases the displacement of motor 14 increases thereby increasing torque capability and when system pressure decreases to decrease the displacement of motor 14 to thereby decrease the torque capability of the motor.

Toward this end the torque valve 78 includes a movable valve member 80 having a land portion 81 positioned to control communication between a valve inlet passage 83 and a valve outlet passage 84 in continuous communication with control passage 60. A reduced portion 85 on the valve member continuously commmunicates with the inlet passages 83 through a central bore in the valve member intersecting a transverse bore 87. Valve member 80 is biased by a suitable spring 89 to a position where land 81 blocks passage 84. When pressure acting on the lower end of valve member 80 exceeds a predetermined value land 81 will move above passage 84 permitting flow from the inlet through transverse bore 87 and into passage 84 flowing into the control cylinder 56 through passage 60.

To assure that the torque multiplication valve 78 responds to the normal high pressure conduit interconnecting the pump 11 and the motor 14 a pump displacement controlled three-way valve 92 is provided. Valve 92 includes a spool valve member 94 having reduced land portions 96 and 97 defining a raised land 98. When valve member 94 is in the neutral position land 98 blocks communication between passages 99, 100 and the torque valve passage 83. When valve member 94 is moved upwardly from the neutral position toward the position shown in the drawing valve land 98 permits communication between passage 100 and passage 83, but if the valve member 94 is moved downwardly from the neutral position communication is established between passage 99 and passage 83. Passages 99 and 100 communicate with conduits 16 and 17, respectively, through interconnecting passages 102 and 103. Thus, when the valve member is in the upper position shown fluid pressure in main conduit 17 is applied to the torque valve 78, and when the valve member 94 is in its lower position fluid pressure in main conduit 16 is applied to the torque valve 78.

The cam 36 functions to place the valve member 94 in its upper position when cam 30 is on the forward side of neutral and to place the valve member in its lower position when cam member 30 is moved across neutral or zero displacement or toward maximum reverse. Toward this end the cam link 36 has an upper camming surface 110 slidably engaging a follower 111 on the end of valve member 94.

The operation of the above described transmission is as follows. As the operator by movement of handle 33 rotates cam member 30 from its neutral or zero displacement position clockwise toward the position shown in the drawing high pressure fluid will be delivered through main conduit 17 to motor port 43 rotating the motor and output shaft 19 in the forward direction driving the vehicle forwardly. Cam surface 110 then shifts valve member 94 upwardly toward the position shown in the drawing providing communication between main conduit 17 in the lower end of torque valve 78. High pressure in conduit 17 during vehicle start-up causes a shifting of valve member 80 upwardly porting fluid through line 60 to displacement control motor 54 placing the motor cam toward maximum displacement position. The motor thus delivers high torque. As the vehicle speed increases and thereby the demand of the motor increases pressure will decrease in passage 17 so that the torque valve 78 moves downwardly permitting a reduction in displacement of the motor 14 increasing the speed of the motor (decreasing transmission ratio) and thereby the vehicle propelling means. If resistance to vehicle movement is encountered pressure in main conduit 17 will increase and the torque valve 78 will again port fluid through line 60 to the control motor 54 increasing the displacement of motor (increasing transmission ratio) 14 providing increased torque to overcome the increased load.

If during operation the operator reduces the displacement of the pump 11 the motor 14 will begin driving the pump 11 as a motor by pressurizing line 16. The pressure in main conduit 17 will rapidly decrease permitting the torque valve (still in communication with main conduit 17) to move downwardly so that the displacement control motor 54 and the pump 11 can move toward and eventually to the minimum displacement position. Thus, braking may be achieved with the motor in minimum displacement rather than maximum displacement so that the braking effect is smooth and much less abrupt than if the motor were at maximum displacement.

The operator can achieve, however, the maximum braking effect by shifting the cam 30 past neutral toward reverse in which case the spool member 94 will provide communication between main conduit 16 and the torque valve 78. Since main conduit 16 is at high pressure during forward braking the torque valve 78 will port fluid through passage 60 to the control motor 54 increasing motor displacement and thereby increasing the braking effect. The transmission operates similarly during overrunning, a condition which might occur when the vehicle begins down an incline. In this case the main conduit 16 will again become the high pressure conduit but the main conduit 17 will remain in communication with the torque valve 78 and since the pressure in the latter conduit decreases during overrunning the displacement of the motor will decrease toward minimum reducing the braking effect during overrunning. Of course, the motor cam 51 is only movable to a minimum displacement position somewhat greater than zero so that the braking effect is reduced but not eliminated.

The transmission is fully reversible so that all of the functions described above are operable when the transmission and the vehicle are placed in the reverse drive. When the vehicle is started from neutral in reverse by the position of handle 33 so that cam 30 is rotated counter-clockwise from the neutral position main conduit 16 will be the high pressure conduit, and main conduit 17 will be the low pressure conduit, just the reverse from that described above in the forward mode. Moreover, cam surface 110 positions valve member 94 to provide communication between main conduit 16, now the high pressure conduit, and the torque valve 78. The torque valve 78 operates as above modulating motor displacement in response to the pressure in conduit 16. When the operator reduces the displacement of the pump back toward neutral or the motor overruns, conduit 17 becomes the high pressure conduit and since the pressure in conduit 16 reduces, the displacement of the motor will be reduced.

I claim:

1. A hydrostatic transmission comprising: an input shaft, a hydraulic pump connected to be driven by said input shaft, an output shaft, a hydraulic motor connected to drive said output shaft, conduit means for conveying fluid from the pump to the motor and conduit means for conveying fluid from the motor to the pump in closed circuit fashion, means for varying the speed ratio of said output and input shafts, control means for said speed ratio means including means responsive to pressure in both of said conduit means and thereby torque at said motor for increasing transmission ratio in response to an increase in torque and for decreasing transmission ratio in response to a decrease in torque, and means responsive to the direction of torque at said motor for modifying the affect of said means responsive to torque on the transmission ratio by limiting an increase in transmission ratio.

2. A hydrostatic transmission as defined in claim 1, wherein said means responsive to the direction of torque at said motor means decreases transmission ratio in response to a reversal of torque.

3. A hydrostatic transmission comprising: an input shaft, a hydraulic pump connected to be driven by said input shaft, an output shaft, a hydraulic motor connected to drive said output shaft, a conduit means for conveying fluid from the pump to the motor in closed circuit fashion, means for varying the speed ratio of said output and input shafts, control means for said speed ratio means including means responsive to pressure in both of said conduit means and thereby torque at said motor for increasing transmission ratio in response to an increase in torque and for decreasing transmission ratio in response to a decrease in torque, and means for modifying the affect of said torque responsive means on the transmission ratio to reduce the braking effect of the transmission by preventing an increase in transmission ratio.

4. A hydrostatic transmission comprising: an input shaft, a hydraulic pump connected to be driven by said input shaft, an output shaft, a hydraulic motor connected to drive said output shaft, first conduit means for normally delivering high pressure fluid from the pump to the motor, second conduit means for normally delivering low pressure fluid from the motor to the pump, means for varying the speed ratio of said output and input shafts, control means for said speed ratio means including means responsive to torque at said motor for increasing transmission ratio in response to an increase in torque and for decreasing transmission ratio in response to a decrease in torque, and means for modifying the affect of said torque responsive means as the pressure in said second conduit means increases with respect to the first conduit means during overrunning or braking by decreasing transmission ratio.

5. A hydrostatic transmission, comprising: a hydraulic pump unit, a hydraulic motor unit, first conduit means connecting the pump to deliver fluid to the motor, second conduit means connecting the motor to return fluid to the pump, means for varying the displacement of the motor to vary the speed ratio thereof, means for varying the displacement of said pump, said pump displacement varying means including means movable from neutral to maximum displacement positions on both sides of neutral to obtain reversible transmission operation, means responsive to pressure in said conduit means for controlling said motor displacement varying means, said pressure responsive means being responsive only to the pressure in said first conduit means when the pump displacement varying means is on one side of neutral and being responsive only to the pressure in said second conduit means when the pump displacement varying means is on the other side of neutral.

6. A hydrostatic transmission as defined in claim 5, including valve means responsive to the position of said pump displacement varying means for selectively connecting one of said conduits to said pressure responsive means.

7. A hydrostatic transmission as defined in claim 5, wherein said motor displacement varying means includes fluid operable means for varying the displacement of said motor unit in one direction from a minimum displacement position, directional valve means for connecting one of said first and second conduit means to said fluid operable means, said directional valve being responsive to the pump displacement movable means so that when the movable means is on one side of neutral the first conduit means is connected to said fluid operable means and when the movable means is on the other side of neutral the second conduit means is connected to said fluid operable means.

8. A hydrostatic transmission as defined in claim 6, including a torque multiplication valve in series with said directional valve for modulating the flow of fluid from said conduit means to said fluid operable means.

9. A hydrostatic transmission, comprising: a hydraulic pump having a rotary cylinder block, axially disposed pistons reciprocable in said block, a cam member for reciprocating said pistons movable from a neutral position to maximum displacement positions on both sides of neutral, manually operable means for positioning said cam member in a desired displacement position, a hydraulic motor having a rotary cylinder block, a plurality of axially disposed pistons in said cylinder block, a cam member for reciprocating said motor pistons movable from a minimum displacement position to a maximum displacement position, fluid operable means for positioning said motor cam member to vary the displacement of the motor, first and second conduit means interconnecting the pump and the motor each adapted to carry high pressure fluid from the pump to the motor or return fluid from the motor to the pump, control means for the motor fluid operable means to vary the transmission torque including a torque valve responsive to pressure in said conduit means for porting fluid to said motor fluid operable means for increasing the displacement of the motor as the pressure in said conduit means increases and for decreasing the displacement of said motor as the pressure in said conduit means decreases, a directional valve for connecting the torque valve to the one of said conduit means normally delivering fluid under pressure from the pump to the motor including a valve member movable from a neutral position blocking flow between said first and second conduit means and said torque valve to a first position on one side of neutral connecting said first conduit means to said torque valve and to a second position on the other side of neutral connecting said second conduit means to said torque valve, and cam means positioned by said manually operable pump displacement means for positioning said valve member in said first position when the pump cam is on one side of neutral and positioning said valve member in said second position when the pump cam is on the other side of neutral whereby during overrunning or engine braking the displacement of the motor will be reduced to reduce the braking effect as the pump cam is returned to neutral and the displacement of the motor will be increased during braking as the pump cam moves across neutral during braking to achieve a maximum braking effect.

References Cited
UNITED STATES PATENTS

| | | |
|---|---|---|
| 2,892,311 | 6/1959 | Vangerpen. |
| 2,892,312 | 6/1959 | Allen et al. |
| 3,054,263 | 9/1962 | Budzich et al. |
| 3,186,170 | 6/1965 | Gauthier et al. _____ 60—53 |
| 3,233,409 | 2/1966 | Reis _____ 60—53 XR |
| 3,371,479 | 3/1968 | Yapp et al. |
| 3,374,847 | 3/1968 | Budzich _____ 60—53 |

EDGAR W. GEOGHEGAN, Priary Examiner

U.S. Cl. X.R.

60—52